No. 741,428. Patented October 13, 1903.

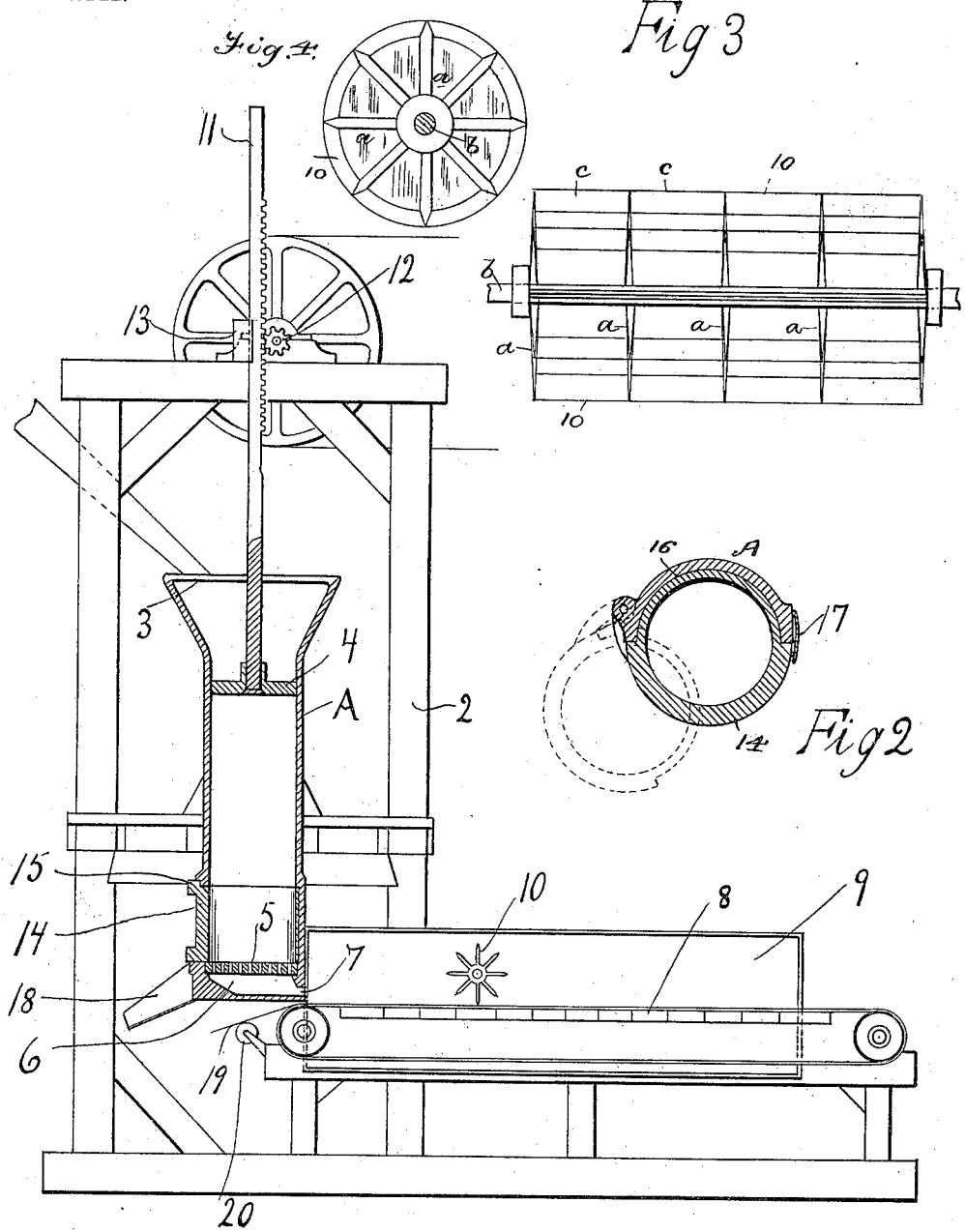

UNITED STATES PATENT OFFICE.

CHARLES R. WILSON, OF SAN FRANCISCO, CALIFORNIA.

FRUIT-PULP MACHINE.

SPECIFICATION forming part of Letters Patent No. 741,428, dated October 13, 1903.

Application filed December 18, 1902. Serial No. 135,714. (No model.)

*To all whom it may concern:*

Be it known that I, CHARLES R. WILSON, a citizen of the United States, residing in the city and county of San Francisco, State of California, have invented an Improvement in Fruit-Pulp Machines; and I hereby declare the following to be a full, clear, and exact description of the same.

My invention relates to an improved apparatus for crushing fruit.

Immense quantities of fruit go to waste annually simply for the reason that the growers have often no means at hand of disposing of the fruit which becomes too ripe for shipment.

The object of my invention is to provide a crusher of simple construction by which this ripe fruit may be reduced to a pulp and the pits extracted and to afford means in connection with the crusher whereby the pulp may be spread into a thin sheet and cut into squares preparatory to drying.

It consists of the parts and the construction and combination of parts, as hereinafter more fully described, having reference to the accompanying drawings, in which—

Figure 1 is a side elevation and partial section of my invention. Fig. 2 is a section through the door. Fig. 3 is a plan view of the cutters. Fig. 4 is an end view of Fig. 3.

A represents a vertically-disposed press-box, here shown in the form of a cylinder supported in the framework 2. Material is fed into the cylinder through a suitable hopper 3. The material is compressed by means of a plunger or follower 4 and is discharged from the cylinder in the form of pulp through the perforations in the bottom plate 5. The latter serves as a strainer to remove the pits, stones, &c. It is made removable, so that plates having perforations of different sizes may be used, according to the fruit to be crushed. Where the nature of the fruit permits of the drying of this crushed product, the latter is received from the cylinder into into a shallow chamber 6, whence it is discharged under pressure of the follower in a thin continuous sheet through a slot 7 upon an endless carrier 8. This carrier passes through a sulfur-chamber 9, wherein the fruit is subjected to the usual bleaching process. In some instances it may be desired to omit sulfuring, in which case the chamber 9 could be dispensed with. Disposed transversely to carrier 8 is a roller having the radial cutters 10, engaging the upper surface of the traveling carrier and adapted to cut the fruit strip into convenient squares conducive to the more ready handling of the product. The cutter 10 is shown in Fig. 3, and it comprises a series of disks $a$, mounted on the shaft $b$ and connected by cutter-bars $c$, running parallel with the shaft. The object of the cutter is to divide the fruit-pulp sheet into squares which may be easily handled. As a result of such treatment fruit that has heretofore not been considered as having a market value may be converted into a high-class merchantable article.

Any suitable means may be employed to reciprocate the follower 4. In the present instance I have shown it connected to a rack-bar 11, engaging a pinion 12 on a shaft receiving power from any appropriate source. The shaft is revolved alternately in one direction and the other to press the follower down to crush the fruit and to retract the follower. Suitable guides, as 13, maintain the engagement of the bar 11 with pinion 12. This construction affords a simple means of exerting great pressure on the fruit by the follower. After the pulp has been squeezed through the holes in plate 5 and the follower retracted the stones, pits, seeds, or other refuse matter remaining in the press-box are removed through and by means of a door 14. This door forms an important part of my invention. It consists, essentially, of a hinged section movable into and out of an aperture in the side of the press-box and having its inner surface (when the section is in closed position) continuous with the inner surface of the press-box, forming, in fact, a part thereof and serving as a container for the residue of the fruit after the follower has completed compression. Specifically it is here shown as comprising a cylindrical section having an interior diameter equal to that of the body of cylinder A. The latter has a segment of one hundred and eighty degrees or greater cut out adjacent to the bottom, and the door-section 14 is hinged at one edge of this opening, as at 15. The remaining segment 16 of cylinder A is cut out to afford a countersink for cylinder 14 when the latter is turned into position to bring its inner surface coincident with the upper portion of the bore of cylinder A. The side of the door corresponding to the cut-out portion of cylinder A is reinforced, as shown in Fig. 2, while the reduced portion fitting within cylinder A is supported by the latter against the force of compression. When the door is closed, the parts are as a rigid unitary structure. Any suitable locking means, as a hook 17 on one part engaging a projection on the other, may be provided to hold the door in closed position within cylinder A.

In operation, the follower being lifted to its highest point, fruit is admitted beneath to the press-box and the follower reciprocated to crush the fruit and press the pulpy portions out through the perforated bottom 5. The plunger is then retracted, the door unlocked and turned on its hinges, causing the withdrawal of all the residue in the press-box and discharging it into a chute 18. As the follower in its downward movement passes well within the part 14 and as the bottom of the latter is flush with the top of plate 5, it is easily understood how the remaining contents of the press-box are removed, as above described.

In order to facilitate the removal of the pulp from the carrier and to prevent the pulp adhering thereto, I may interpose a sheet of oil-paper or other suitable material between the carrier and the incumbent pulp. In the present instance I have shown a continuous sheet of paper, as 19, wound upon a roller 20 at the head end of the carrier and the end of the sheet passed beneath chamber 6 over the surface of the carrier and beneath cutters 10. The weight of the pulp upon the paper causes the latter to be drawn along with the carrier.

Having thus described my invention, what I claim, and desire to secure by Letters Patent, is—

1. In a machine of the character described, the combination of a press-box; a follower movable therein; a foraminous plate in the box said box having a door-controlled opening for giving direct access to the plate; a pulp-receiving chamber below the plate, having a narrow discharge-slot at the lower portion through which the pulp is delivered in a thin sheet; a carrier upon which said sheet is delivered; and means in relation to the carrier by which the pulp-sheet may be cut into squares.

2. In a machine of the class described, the combination of a press-box; a pulp-expressing mechanism; means for separating the refuse matter from the pulp; a door in the press-box leading directly to the separating means; a pulp-receiving chamber having a narrow slot adapted to deliver the pulp in sheet-like form; and a conveyer receiving said sheet of pulp.

3. In a machine of the class described, the combination of a press-box; a pulp-expressing mechanism; means in said box for separating the pits, stones and refuse matter from the pulp; a door in the press-box leading directly to the separating means; a pulp-receiving chamber having a narrow slot for delivering the pulp in sheet-like form; a conveyer upon which the sheet of pulp is delivered; and means for cutting the sheet of pulp into sections.

4. In a machine of the class described, the combination with a press-box, an expressing mechanism; means for separating the pits, stones, and refuse matter from the pulp, and a pulp-receiving chamber having a contracted outlet, of a horizontally-disposed endless carrier, a chamber through which said carrier is movable, and radial cutters bearing on the surface of the carrier and operatable thereby.

5. In a fruit-pulp machine, a press-box comprising a vertically-disposed cylinder having a removable perforated bottom, a follower reciprocable in said cylinder, and a hinged cylindrical door substantially as described in said cylinder.

6. In a fruit-pulp machine, a press-box having a perforated bottom, said box provided with an opening in the side, and a hinged movable section conformable in cross-section to that of the press-box fitting said opening, said section when inserted within said opening having its inner surface coincident with that of the press-box.

7. In a fruit-pulp machine the combination of a press-box comprising a vertically-disposed cylinder, a perforated bottom therefor, said cylinder having a side opening adjacent to said bottom, and a closure for said opening, said closure including a hollow cylindrical section hinged at one side of said opening and movable therein.

8. In a fruit-crusher, a press-box comprising a vertically-disposed cylinder having a perforated bottom, said cylinder provided with a side opening adjacent to said bottom, a hinged cylindrical section fitting said opening, said section when inserted therein having its bore coincident with the bore of the press-box cylinder, and adapted when opened to remove the contents from the latter.

9. In a fruit-pulp machine, the combination of a press-box; an expressing mechanism; means for separating the pits, stones, and refuse matter from the pulp; a cylindrical door in the press-box leading to the separating means; a pulp-receiving chamber having a narrow slot; an endless carrier upon which the pulp is received in sheet-like form; and a continuous sheet of non-adhesive material supported on the carrier and upon which the pulp is received.

In witness whereof I have hereunto set my hand.

CHARLES R. WILSON.

Witnesses:
S. H. NOURSE,
JESSIE C. BRODIE.